Figure 5:
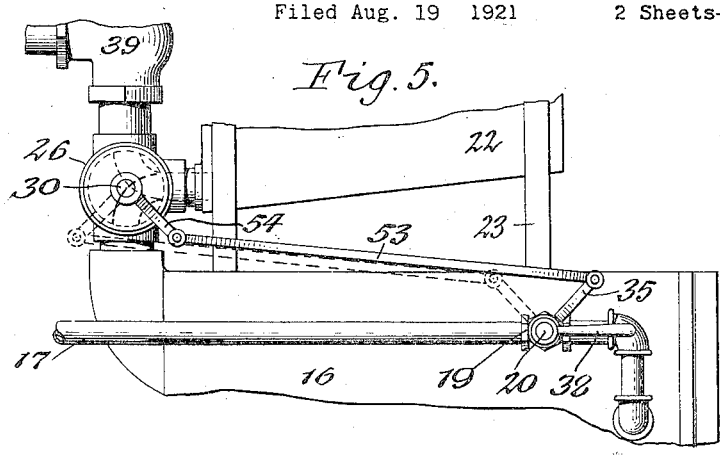

Aug. 12, 1924.  
H. B. HAMMILL  
ICE CREAM FREEZER  
Filed Aug. 19, 1921        2 Sheets-Sheet 1
1,504,756
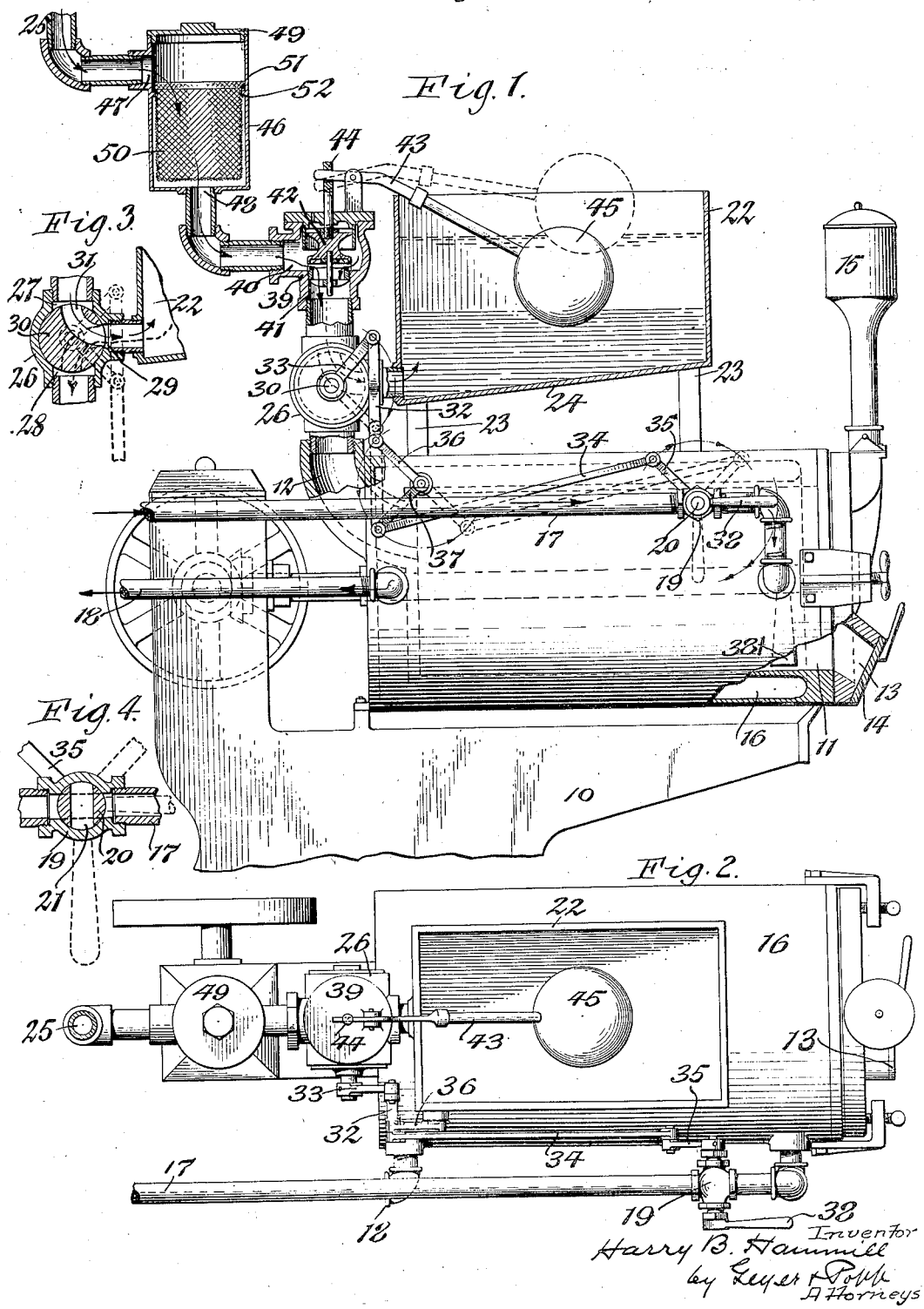

Aug. 12, 1924.

H. B. HAMMILL

ICE CREAM FREEZER

Filed Aug. 19 1921

1,504,756

2 Sheets-Sheet 2

Inventor
Harry B. Hammill
by Geyer & Robb
Attorneys

Patented Aug. 12, 1924.

1,504,756

UNITED STATES PATENT OFFICE.

HARRY B. HAMMILL, OF BUFFALO, NEW YORK.

ICE-CREAM FREEZER.

Application filed August 19, 1921. Serial No. 493,593.

*To all whom it may concern:*

Be it known that I, HARRY B. HAMMILL, a citizen of the United States, residing in Buffalo, in the county of Erie and State of New York, have invented new and useful Improvements in Ice-Cream Freezers, of which the following is a specification.

This invention relates to an ice cream freezer of the type which are commonly employed for manufacturing ice cream on a large scale for commercial purposes by means of power. In ice cream freezers of this character as heretofore constructed, the valve mechanism which controls the supply of ice cream mixture to the freezing chamber or cylinder and the valve mechanism which controls the supply of refrigerant to the refrigerating jacket around the refrigerating chamber, were so organized that they could be opened and closed manually independently of each other which not only involved a loss of time in the operation of the machine and reduced the output of the same, but also interfered with the most effective working of the machine and in the accuracy of the quantity of material which was delivered into the freezing chamber when making each batch of ice cream.

One of the objects of this invention is to provide an ice cream freezer of this character in which the valve mechanism which controls the supply of ice cream mixture in the freezing chamber and the valve mechanism which controls the supply of refrigerant to the refrigerating jacket are coupled up in such a manner that when the flow or supply of brine or other refrigerating agent to the refrigerating jacket is cut off at the completion of the freezing operation of a batch of mixture, then communication will also be cut off from the freezing chamber and the measuring tank from which the ice cream mixture is delivered in measured quantities to the freezing chamber and instead this tank is connected with the source of supply of ice cream mixture preparatory to measuring another batch of ice cream mixture for the next following batch of ice cream, and vice versa, thereby avoiding the necessity of operating these valve devices independently of each other, which otherwise involves a loss of time and uncertainty of operation.

Another object of this invention is to so organize this ice cream freezer that a measured quantity of the ice cream mixture is filtered and permitted to accumulate while a previously measured and filtered quantity of ice cream mixture is being frozen in the freezing chamber, thereby permitting one attendant to supervise a series of ice cream freezers in succession and thus utilize the time of the operator to better advantage.

Further objects of this invention are to improve the ice cream freezer in various details of construction as will presently appear.

Figure 6:
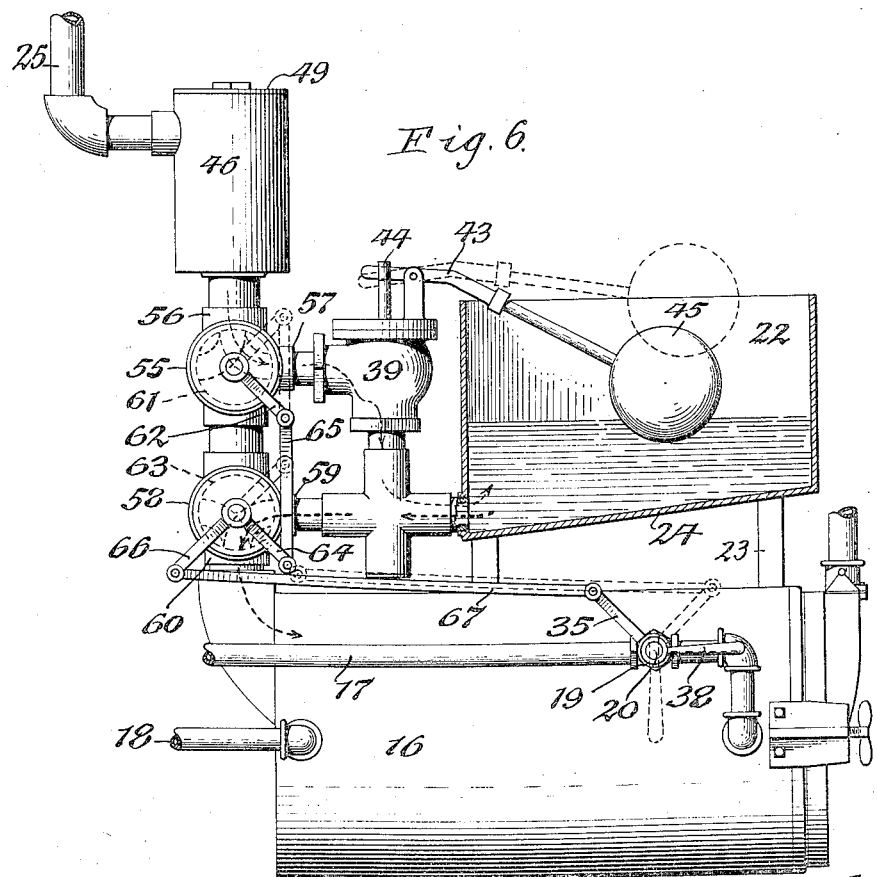

In the accompanying drawings:

Figure 1 is a side elevation of an ice cream freezer, partly in section, showing one form of my invention. Fig. 2 is a top plan view of the same. Fig. 3 is a vertical section of the valve which controls the passage of the ice cream mixture from the source of supply to the measuring tank and from the latter to the freezing chamber. Fig. 4 is a similar view of the valve which controls the admission of the refrigerant to the refrigerating jacket which surrounds the freezing chamber. Fig. 5 is a fragmentary side elevation of an ice cream freezer showing another form of my invention. Fig. 6 is a side elevation, partly in section, showing still another construction embodying my improvements.

Similar characters of reference refer to like parts in the several figures of the drawings.

Although this invention is applicable to ice cream freezers which may vary as to detail, construction and arrangement of the several parts, that shown in the drawings as an example of one suitable for utilizing my invention comprises a main frame 10, a freezing chamber or cylinder 11 mounted horizontally on the upper front part of the main frame and provided on the upper part of its rear end with an inlet 12 for the ice cream mixture and an outlet 13 at its lower front end from which the frozen or finished ice cream is discharged from the machine, a gate or valve 14 which controls the outlet 13 of the freezing chamber, a fruit reservoir 15 which connects with the upper front part of the freezing chamber and is adapted to supply fruit of various kinds to the ice cream when this is desired, and a refrigerating jacket 16 which surrounds the freezing chamber and through which a refrigerant is circulated such as cold brine, for the purpose of lowering the temperature and freezing the mixture in the freezing chamber.

The brine or other refrigerating agent is supplied to the refrigerating jacket at one front end thereof by means of a pipe 17 and at the rear end of this jacket, the same is provided with a discharge pipe 18 for the spent brine or refrigerating medium after the same has imparted its cooling effect to the ice cream mixture, it being understood that this refrigerant is continuously circulated by a pump of any suitable character and the brine is cooled after being withdrawn from the refrigerating jacket through the return pipe and before it is again returned to this jacket by means of the supply pipe 17.

The admission of the brine to the refrigerating jacket is controlled by means of a valve, which may be of any suitable construction, for instance, as shown in Figs. 1, 2, and 4, the same comprising a valve body 19 which has its opposite ends connected with the brine supply pipe 17, so as to form a part thereof, and a rotary valve plug 20 arranged within the valve body 19 and provided with a port 21, which may be turned so that the same is out of register with the passage through the valve body, as shown by full lines in Fig. 4, and therefore closes the valve, while upon turning this valve plug so that its port is in line or register with the passage through the valve, then this valve is opened and the brine is permitted to pass through the pipe 17 to the refrigerating jacket for the purpose of cooling the contents of the freezing chamber.

Above the freezing chamber and refrigerating jacket is arranged a measuring tank 22 which is adapted to receive successive batches of ice cream mixture, which are to be frozen into ice cream in the freezing chamber. This tank is supported upon the main frame by means of brackets 23 and has an inclined bottom 24 which slopes rearwardly and is open at the top. Adjacent to the lower rear end of the measuring tank the same is connected with a valve mechanism, which is constructed to place this tank either in communication with a supply pipe 25 or with the inlet 12 of the freezing chamber, said supply pipe 25 being in communication with the main source of supply of ice cream mixture. The valve whereby this purpose is accomplished may be variously constructed, but that shown in Figs. 1, 2 and 3 is an example of one suitable for this purpose, and is constructed as follows: 26 represents a valve casing having an inlet 27 at its upper end, an outlet 28 at its lower end and a combined inlet and outlet 29 at its side. The outlet 28 is connected with the inlet 12 of the freezing chamber and the combined inlet and outlet 29 is connected with the lower end of the measuring tank 22. Within the body 26 is a rotary plug 30 having a port 31, which upon turning into one position places the inlet 27 in communication with the measuring tank, as shown by full lines in Fig. 3 and by dotted lines in Fig. 1, while upon turning this plug one quarter about its axis in the proper direction to the position indicated by dotted lines in Fig. 3, the measuring tank will be cut off from the inlet 27 and placed in communication with the freezing chamber. When, therefore, the valve mechanism of which the body 26 and plug 30 form a part are in the position indicated in Figs 1 and 3, the ice cream mixture is permitted to flow from the inlet of this valve mechanism into the measuring tank and upon reversing the position of the plug 30 of this valve, the measuring tank will be cut off from its source of supply and its contents will be discharged into the freezing chamber preparatory to freezing this mixture therein.

Means are provided which operatively connect the valve mechanism which controls the flow of the refrigerant to the refrigerating jacket and the valve mechanism which controls the flow of the ice cream mixture to the measuring chamber and from the latter to the freezing chamber, so that these valve mechanisms operate in unison and cause the reversing valve plug 30 to be automatically operated whenever the brine controlling valve is shifted, so that when the brine valve is closed and the flow of brine is cut off from the refrigerating jacket, the reversing valve plug 30 will be turned, so as to permit the flow of ice cream mixture into the measuring tank but cut off communication from the latter to the freezing chamber, while upon turning the brine controlling valve to the position in which brine is permitted to flow to the refrigerating jacket, then the measuring tank will be cut off from the source of supply and placed in communication with the freezing chamber so that the previously measured batch of ice cream mixture will flow from the tank into the freezing chamber ready to be frozen into the finished ice cream. The means shown in Figs. 1 and 2 for thus causing the ice cream mixture controlling valve mechanism and the brine controlling valve mechanism to operate in this manner, consist of an upper link 32 which connects its upper end with an arm 33 on the outer end of the valve plug 30, a lower link 34 connected at its front end with the upper end of an arm 35 connected with the outer end of the valve plug 20, and a bell-crank lever pivoted on the outer side of the refrigerating jacket and having its upper arm 36 connected with the lower end of the link 32 and its lower arm 37 connected with the rear end of the lower link 34. The outer end of the valve plug 20 is provided with a handle 38. In Figs. 1 and 2, the handle 38 is arranged horizontally and projects forwardly from its valve plug 20 in which position the brine is cut off from the refrigerating jacket and the measuring tank is cut off from the freezing chamber, and placed in communication with the ice cream mixture supply. At this time the particular batch of ice cream mixture in the freezing chamber has been finished into ice cream and is ready to be discharged therefrom by opening the gate 14, and while such unloading of the finished ice cream is taking place, the next following batch of ice cream mixture is permitted to flow into the measuring tank. After the finished batch of ice cream has been removed from the freezing chamber and the outlet valve 14 has been closed, the operator shifts the hand lever 38 from its forwardly projecting horizontal position to a position in which the same projects downwardly from the valve plug 20, thereby causing the latter to permit the flow of refrigerant into the refrigerating jacket, while at the same time the previously measured batch of ice cream mixture is permitted to flow from the measuring tank into the freezing chamber, but cutting off further flow from the source of mixture supply to the measuring tank. After this ice cream mixture has been transferred from the measuring tank to the freezing chamber, the same is agitated and beaten in the freezing chamber by any suitable means such for instance as, a rotary beater of which the blade 381 forms a part, until the mixture has been frozen to the requisite extent by the cooling effect of the brine which circulates through the refrigerating jacket.

By thus operating the ice cream mixture controlling valve automatically and simultaneously in harmony with the operation of the brine controlling valve, separate operation of the mixture supply valve is unnecessary and the same is always opened and closed at the right time, so that no particular attention need be paid to the same by the attendant. It follows from this that the attendant is relieved from considerable care and this enables him to operate a number of ice cream freezing machines of this character with the same amount of effort heretofore required to operate a single machine. When operating a gang of ice cream freezers equipped with my improvement, an attendant can pass successively from one machine to another for the purpose of unloading the finished ice cream and reloading the same with a new batch of ice cream mixture. The number of machines placed in the charge of one attendant are previously so determined that the freezing and completion of the batch of ice cream in one machine will be completed while the attendant is unloading and reloading the remaining machines of the same series or group.

Means are provided for automatically arresting the flow of the ice cream mixture into the measuring tank when a pre-determined quantity of this mixture has been delivered into the measuring tank, these means being preferably so designed that they are controlled by the liquid level of the mixture in the tank. An instance of means suitable for this purpose is shown in Figs. 1 and 2, which means are float controlled and comprise a valve casing 39 having an inlet 40 and an outlet 41 connected with the inlet 27 of the reversing valve, a balanced valve member 42 movable lengthwise toward and from a valve seat within the casing 39, a float lever 43 pivoted on the valve casing 39 and having its outer arm connected with the stem 44 of the valve member 42, and a float 45 mounted on the inner arm of the float lever and arranged within the measuring tank. When the measuring tank is empty or the liquid level therein is below normal, the float 45 is in its lower position and the valve member 42 is raised from its seat, as shown in Fig. 1, thereby permitting the ice cream mixture to flow from the source of supply through the float control valve into the measuring tank, but when a sufficient quantity of the mixture has been delivered into the measuring tank and the level of the mixture in the latter has reached a predetermined point the float 45 will be raised into the position indicated by dotted lines in Fig. 1 and the float valve member 42 will be lowered so as to close the float valve and prevent the further admission of ice cream mixture into the measuring tank. Obviously the flow of ice cream mixture from the source of supply into the measuring tank will be again resumed when the charge of mixture in the measuring tank has escaped therefrom, and the float again descends during the escape of this mixture, thereby automatically measuring the successive batches of ice cream mixture which are admitted to the freezing chamber and avoiding the necessity of paying any attention to the operation of the machine for this purpose.

In order to remove any solid matter from the ice cream mixture before the same reaches the measuring tank, a screening or filtering device is provided which is preferably constructed as follows:

46 represents a filter or screen chamber provided on one side near the upper end thereof with an inlet 47 which communicates with the pipe 25, by which the ice cream mixture is supplied to the machine from any suitable source, while the lower end of the chamber 46 is provided with an outlet 48 which is connected with the inlet 40 of the float valve and the upper end of the same is provided with a removable cover 49. Within the lower part of this filter chamber is arranged a basket shaped screen 50 of woven wire or other suitable material which in its normal position is arranged below the inlet 47 of the filter chamber and separated at its lower end and at its sides from the adjacent bottom and side walls of the filter chamber while its upper end is fitted against the side wall of the filter chamber, as shown in Fig. 1. It follows from this construction that the ice cream mixture entering the upper end of the filter chamber through the inlet 47 thereof is compelled to pass through the screen 50 before it can escape through the outlet 48 of the filter chamber and pass on to the measuring tank and eventually reach the freezing chamber, thereby causing any solid matter in the ice cream mixture to be separated therefrom and retained within the screen 50. The latter is removably supported within the screen or filter chamber so as to permit of lifting the same out of the opening in the top of the filter chamber if the cover 49 has been removed and then discharging any solid matter from the screen. For the purpose of thus removably supporting the screen 50 within the filter chamber the upper end of the screen is provided with an annular enlargement forming a downwardly facing shoulder 51 which engages an internal annular shoulder 52 formed on the inner side of the filter chamber. The screen 50 rests by gravity with its shoulder 51 on the shoulder 52 of the filter chamber, thereby supporting the screen on the filter chamber in such manner as to form a sufficiently tight joint between the same to prevent the passage of any solid matter while at the same time permitting the screen to be easily removed from the chamber for cleaning purposes.

Instead of employing the intermediate connecting mechanism between the brine valve and the mixture controlling valve shown in Figs. 1 and 2, that shown in Fig. 5 may be substituted. As shown in the last mentioned construction, the valve plug 20 of the brine valve has its arm 35 connected directly by means of a link 53 with an arm 54 projecting downwardly from one end of the valve plug 30 of the mixture valve. The construction and arrangement of the valve mechanism shown in Fig. 5 is such that upon opening the brine valve 20, the mixture controlling valve plug 30 will be so turned as to cut off communication between the measuring tank 22 and the mixture supply pipe but establishing communication between this tank and the freezing chamber, and vice versa.

If desired separate valves may be employed for controlling the communication between the source of supply and the measuring tank, and between the measuring tank and the freezing chamber which separate valves are, however, coupled with the brine controlling valve so that the flow of ice cream mixture from the measuring tank to the freezing chamber occurs at the same time that the flow of brine is permitted to enter the refrigerating jacket, but when the flow of brine is cut off, the measuring tank will also be cut off from the freezing chamber and the former is placed in communication with the supply of ice cream mixture. Such an organization is shown in Fig. 6 and is constructed as follows:

55 represents the casing of an upper valve having an inlet 56 connected with the outlet of a filter chamber 46 and an outlet 57 at its side which communicates with the inlet of the float valve casing 39, and 58 is the casing of a lower controlling valve which has an inlet 59 at its side which communicates with the outlet of the float valve casing 39 and the opening at the lower end of the measuring tank 22 and is also provided with an outlet 60 at its lower end which communicates with the inlet of the freezing chamber. In the valve casing 55 is a rotary valve plug 61 which is provided at its outer end with an arm 62, and in the lower valve casing 58 is arranged a rotary valve plug 63 which is provided at its outer arm with a rock arm 64. The rock arms 62 and 64 are connected by link 65, so that they move in unison. The outer end of the valve plug 63 is also provided with a rock arm 66 which is connected by means of a link 67 with the arm 35 of the valve plug 20 which controls the flow of brine to the refrigerating jacket. These several valves are so timed and operated by the intermediate connecting mechanism between the same that when the handle 38 of the brine valve is in its horizontal forwardly projecting position, as shown in Fig. 6, the brine valve will be closed so as to cut off the admission of refrigerant to the refrigerating jacket, the valve plug 63 will be turned so as to cut off communication between the measuring tank and the freezing chamber, and the valve plug 61 is turned so that the ice cream mixture is permitted to flow from the supply pipe 25 through the float valve 39 and to the measuring tank until the level in the latter has reached the requisite heighth and the float valve 39 is closed by the float 45. After removing the batch of finished ice cream from the freezing chamber, the operator turns the handle 38 from the position shown by full lines in Fig. 6 to the position shown by dotted lines in the same figure, whereby the flow of brine to the refrigerating jacket will be resumed, the valve plug 63 will be turned so as to permit the flow of a batch of ice cream mixture from the measuring tank into the freezing chamber, and the valve plug 61 will be turned so as to cut off the further flow of ice cream mixture from the supply pipe 25 into the measuring chamber.

In each of the several forms of my invention above described and shown in the drawings, the valves which control the flow of refrigerant to the refrigerating jacket and the flow of ice cream mixture to the measuring chamber and from the latter to the freezing chamber are so organized and connected with each other that they always operate in unison and assume a definite relationship with reference to each other so that a single operation on the part of the attendant causes these valves to assume either one position or another, starting or stopping the flow of brine and starting or stopping the supply of ice cream mixture, thereby facilitating the operation of the machine and relieving the attendant of the necessity of independently operating a plurality of devices for accomplishing these several purposes as has been necessary heretofore, with the result that the attendant can work a large number of machines with less mental effort and greater certainty of uniformity of product and also enabling the maximum output of the machines to be obtained.

I claim as my invention.

An ice cream freezer comprising a freezing chamber, a refrigerating jacket surrounding the freezing chamber, a measuring tank for measuring the liquid to be frozen and having a communicating passage, an ice cream mixture supply pipe, an ice cream mixture controlling valve having its casing connected with said supply pipe, said measuring tank and said freezing chamber and having a movable plug which in one position connects said measuring tank with said supply pipe and in another position connects said measuring tank with said freezing chamber, a refrigerant controlling valve having a casing connecting with a refrigerant supply and with said jacket and having a movable plug adapted to open and close the passage through said refrigerant valve casing, and means operatively connecting the plug of said ice cream mixture controlling valve and the plug of said refrigerant controlling valve and operating in one position to close the refrigerant controlling valve and shift the mixture controlling valve so that it disconnects the freezing chamber from the measuring chamber and in another position to open said refrigerant valve and shift said mixture controlling valve so that it connects the mixture tank with the freezing chamber.

HARRY B. HAMMILL.